(12) United States Patent
Gala et al.

(10) Patent No.: US 8,214,703 B2
(45) Date of Patent: Jul. 3, 2012

(54) TESTING MULTI-CORE PROCESSORS

(75) Inventors: Murali Mohan Reddy Gala, San Jose, CA (US); Olivier Francis Cyrille Caty, Sunnyvale, CA (US); Thomas Alan Ziaja, Austin, TX (US); Paul Dickinson, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 225 days.

(21) Appl. No.: 12/401,354

(22) Filed: Mar. 10, 2009

(65) Prior Publication Data

US 2010/0235683 A1    Sep. 16, 2010

(51) Int. Cl.
*G01R 31/28* (2006.01)
*G06F 11/00* (2006.01)

(52) U.S. Cl. ........... 714/729; 714/30; 714/726; 714/736
(58) Field of Classification Search .............. 714/30, 714/726, 729, 736
See application file for complete search history.

(56) References Cited

U.S. PATENT DOCUMENTS

| | | | | |
|---|---|---|---|---|
| 7,032,141 B2 * | 4/2006 | Tanizaki | | 714/718 |
| 7,080,300 B1 * | 7/2006 | Herron et al. | | 714/726 |
| 7,139,947 B2 * | 11/2006 | Miner et al. | | 714/726 |
| 7,263,642 B1 * | 8/2007 | Makar et al. | | 714/736 |
| 7,353,440 B2 * | 4/2008 | Ohwada et al. | | 714/726 |
| 7,386,775 B2 * | 6/2008 | Birmiwal et al. | | 714/729 |
| 7,464,311 B2 * | 12/2008 | Larson et al. | | 714/727 |
| 7,657,809 B1 * | 2/2010 | Bhatia | | 714/729 |
| 7,673,208 B2 * | 3/2010 | Seuring | | 714/736 |
| 7,685,487 B1 * | 3/2010 | Kuo et al. | | 714/726 |
| 7,689,884 B2 * | 3/2010 | Seuring | | 714/729 |
| 2004/0006729 A1 * | 1/2004 | Pendurkar | | 714/733 |
| 2009/0150112 A1 * | 6/2009 | Parulkar | | 702/118 |

* cited by examiner

*Primary Examiner* — John J Tabone, Jr.
(74) *Attorney, Agent, or Firm* — Polsinelli Shughart PC (57) ABSTRACT

Methods and apparatuses are disclosed for testing multicore processors. In some embodiments, the tested multicore processor may include at least a first core and a second core, a data input coupled to a first scan chain in the first core and a second scan chain in the second core, and a multiplexer including at least a first input and a second input, the first input coupled with a data output of the first scan chain and the second input coupled with a data output of the second scan chain, the multiplexer further including an output that couples to one or more pins on a package of the processor, the multiplexer further including a select signal that couples to the one or more pins on the package of the processor, and wherein the data input couples to the one or more pins on the package of the processor.

20 Claims, 6 Drawing Sheets

TESTING MULTI-CORE PROCESSORS

FIELD OF THE INVENTION

The present invention relates generally to testing of electronic devices, and more particularly to testing multi-core processors.

BACKGROUND

Electronic devices are ubiquitous in society and can be found in everything from wristwatches to computers. The complexity and sophistication of electronic devices usually increases with each generation. This trend may be especially true with each generation of microprocessors. For example, newer processors often implement multiple blocks, sometimes referred to as "cores", where each core may be capable of concurrently executing at least some of the program code. By having multiple cores concurrently executing program code, the overall execution speed of programs on a computer that utilizes a multi-core processor may be greater than the single core processor based computer.

In practice, multi-core processors may be implemented on a single integrated circuit (IC). While implementing the multiple cores on a single IC may be advantageous in that the processor may be capable of increased processing power, it may present new challenges in terms of ensuring that the IC is functional. ICs are generally tested in a variety of ways prior to their deployment in an electronic device. Traditional methods of testing single core processors include providing testing signal patterns to the pins of the IC and observing the results on different pins of the IC. Unfortunately, as the number of cores on a processor increases, there may not be enough pins to dedicate to each core for testing purposes. Accordingly, there is a need for providing methods and apparatuses for testing multi-core processors that overcome one or more of the aforementioned problems.

SUMMARY

Methods and apparatuses are disclosed for testing multi-core processors. In some embodiments, the tested multicore processor may include at least a first core and a second core, a data input coupled to a first scan chain in the first core and a second scan chain in the second core, and a multiplexer including at least a first input and a second input, the first input coupled with a data output of the first scan chain and the second input coupled with a data output of the second scan chain, the multiplexer further including an output that couples to one or more pins on a package of the processor, the multiplexer further including a select signal that couples to the one or more pins on the package of the processor, and wherein the data input couples to the one or more pins on the package of the processor.

Other embodiments may include a method of testing a processor including a plurality of cores. The method may include providing a plurality of input signals to a plurality of cores; monitoring a global signal that is indicative of a response of each core in the plurality of cores to at least one input signal in the plurality of input signals; in the event that the global signal indicates that at least one core in the plurality of cores is non-functional, selectively coupling a response of a first core within the plurality to a package pin of the processor; comparing the response of the first core to an expected value; and in the event that the response of the first core matches an expected value, selectively coupling the response of a second core within the plurality to the package pin of the processor.

Still other embodiments may include a computer including a memory and a multicore processor coupled to the memory. The processor may include a plurality of cores, comprising a first core and a second core; a data input coupled to a first scan chain in the first core and a second scan chain in the second core; and a multiplexer including at least a first input and a second input, the first input coupled with a data output of the first scan chain and the second input coupled with a data output of the second scan chain, the multiplexer further including an output that couples to one or more pins on a package of the processor, the multiplexer further including a select signal that couples to the one or more pins on the package of the processor, and where the data input couples to the one or more pins on the package of the processor.

BRIEF DESCRIPTION OF THE DRAWINGS

The use of the same reference numerals in different drawings indicates similar or identical items.

DETAILED DESCRIPTION

In some embodiments, methods and apparatuses may be provided that allow pins to be conserved in an IC including multiple processor cores. Each core within the processor may include a certain number of scan chains. A common input may provide the scan chains with an input value, where each common input may consume a pin on the package of the processor. The outputs of the scan chains may be internally compared to an expected value that is fed from testing equipment external to the processor. The results of comparing the outputs of the scan chains to an expected value may be stored in a register within the processor. Although internal comparisons may be made between expected and actual results from each scan chain, package pins may be conserved by selectively coupling the output of each of the scan chain and/or the results of the comparison to a pin on the package of the processor. Furthermore, the testing process may be made more flexible by masking the comparison from time-to-time, such as in the event that predetermined simulations predict a discrepancy between expected and actual results.

Figure 1:
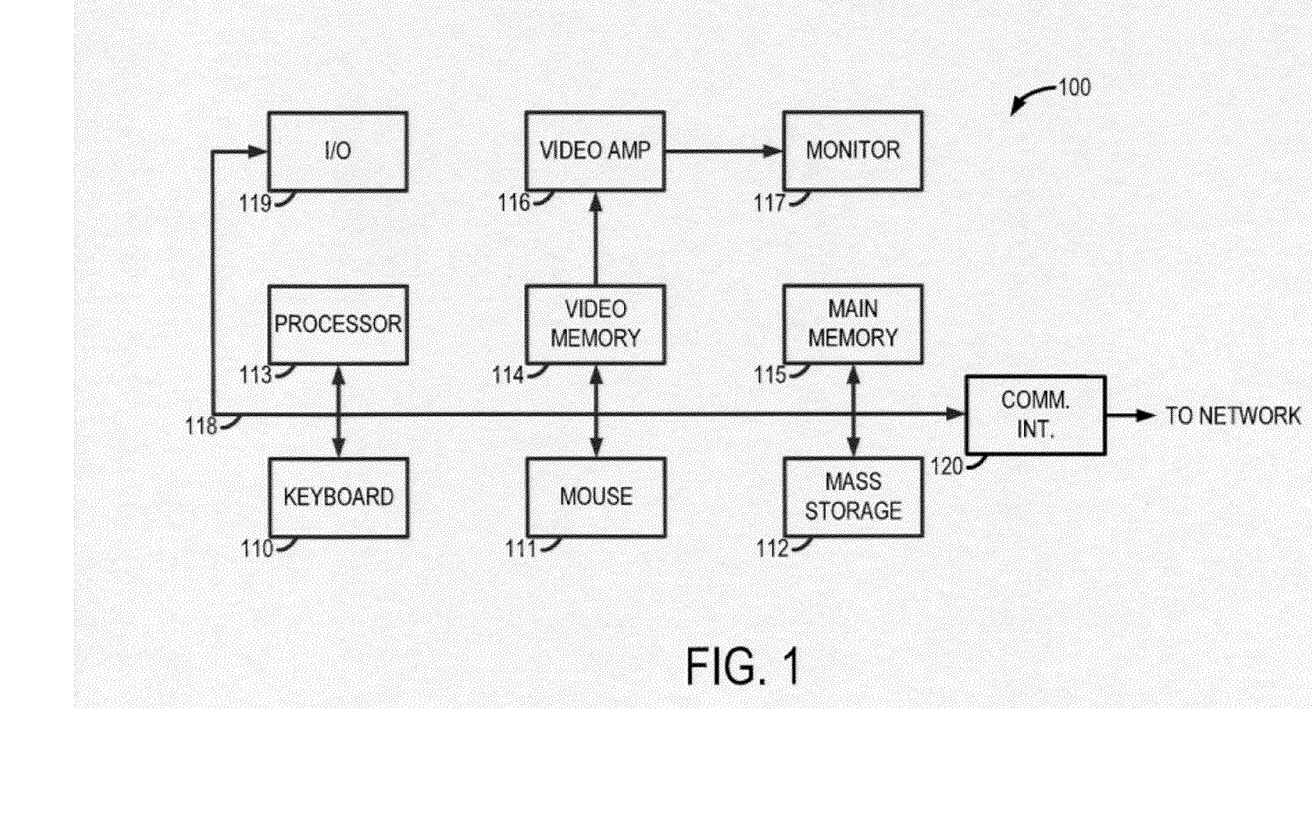
FIG. 1 illustrates an exemplary computer system.

FIG. 1 illustrates a computer system 100 including a processor capable of being tested in such a way as to conserve pins of the processor. In some embodiments, the computer system 100 may be an implementation of enterprise level computers, such as one or more blade-type servers within an enterprise. In other embodiments, the computer system 100 may be a personal computer and/or a handheld electronic device. A keyboard 110 and mouse 111 may be coupled to the computer system 100 via a system bus 118. The keyboard 110 and the mouse 111, in one example, may introduce user input to the computer system 100 and communicate that user input to a processor 113. Other suitable input devices may be used in addition to, or in place of, the mouse 111 and the keyboard 110. An input/output unit 119 (I/O) coupled to a system bus 118 represents such I/O elements as a printer, audio/video (A/V) I/O, etc.

Computer 100 also may include a video memory 114, a main memory 115 and a mass storage 112, all coupled to the system bus 118 along with the keyboard 110, the mouse 111 and the processor 113. The mass storage 112 may include both fixed and removable media, such as magnetic, optical or magnetic optical storage systems and any other available mass storage technology. The bus 118 may contain, for example, address lines for addressing the video memory 114 or the main memory 115. In some embodiments, the main memory 115 is a fully buffered dual inline memory module (FB-DIMM) that communicates serially with other system components.

The system bus 118 also may include a data bus for transferring data between and among the components, such as the processor 113, the main memory 115, the video memory 114 and the mass storage 112. The video memory 114 may be a dual-ported video random access memory. One port of the video memory 114, in one example, is coupled to a video amplifier 116, which is used to drive a monitor 117. The monitor 117 may be any type of monitor suitable for displaying graphic images, such as a cathode ray tube monitor (CRT), flat panel, or liquid crystal display (LCD) monitor or any other suitable data presentation device.

In some embodiments, the processor 113 is a SPARC® microprocessor from Sun Microsystems, Inc, although any other suitable microprocessor or microcomputer may be utilized. The processor 113 and the processor's 113 testing mechanisms are described in more detail below with regard to FIGS. 2-6.

The computer system 100 also may include a communication interface 120 coupled to the bus 118. The communication interface 120 provides a two-way data communication coupling via a network link. For example, the communication interface 120 may be a local area network (LAN) card, or a cable modem, and/or wireless interface. In any such implementation, the communication interface 120 sends and receives electrical, electromagnetic or optical signals that carry digital data streams representing various types of information.

Code received by the computer system 100 may be executed by the processor 113 as it is received, and/or stored in the mass storage 112, or other non-volatile storage for later execution. In this manner, the computer system 100 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

During the manufacture of the processor 113, one or more tests may need to be performed to ensure that constituent logic within the processor 113 operates as anticipated. For example, the tests may include "stuck-at" tests to determine if a manufacturing defect, such as a shorted or open connector, exists within the processor 113. In a multi-core implementation, each core within the processor 113 may need to be tested separately or in conjunction with other cores. Regardless of the type of test performed on each core, testing each core may require access to multiple inputs and/or outputs of the processor 113 via pins of the IC's packaging. Thus, in a multi-core implementation, the number of pins required to test each core of the processor 113 may be more than the number available.

Conventional approaches often address the problem of having a limited number of testing pins by providing the same input to two or more scan chains within the processor 113 and bringing the outputs from each scan chain to package pins of the chip. For purposes of this disclosure, the term "scan chain" refers to a testing mechanism that provides the ability to observe the outputs of constituent logic elements within an IC. The outputs may be serial connections of registers for storage and/or retrieval of testing data. The drawback of using scan chains in this manner is the consumption of a package pin for each scan chain, where there may be numerous scan chains in the case of several scan chains per core in a multi-core design. Another conventional approach is to provide two or more scan chains within the processor 113 with the same input, making a comparison of the scan chain outputs on chip, and then feeding the comparison off chip through package pins. While this approach may reduce the number of pins used, it too has drawbacks. For example, if the comparison indicates that the scan chain results do not match an expected value, the result of the comparison does not indicate which of the cores is non-functional. Furthermore, there may be intermediate testing cycles of the processor 113 where the results do not match, but yet they end up matching at the end—i.e., premature indication causes a false positive that is not ignored.

Figure 2:
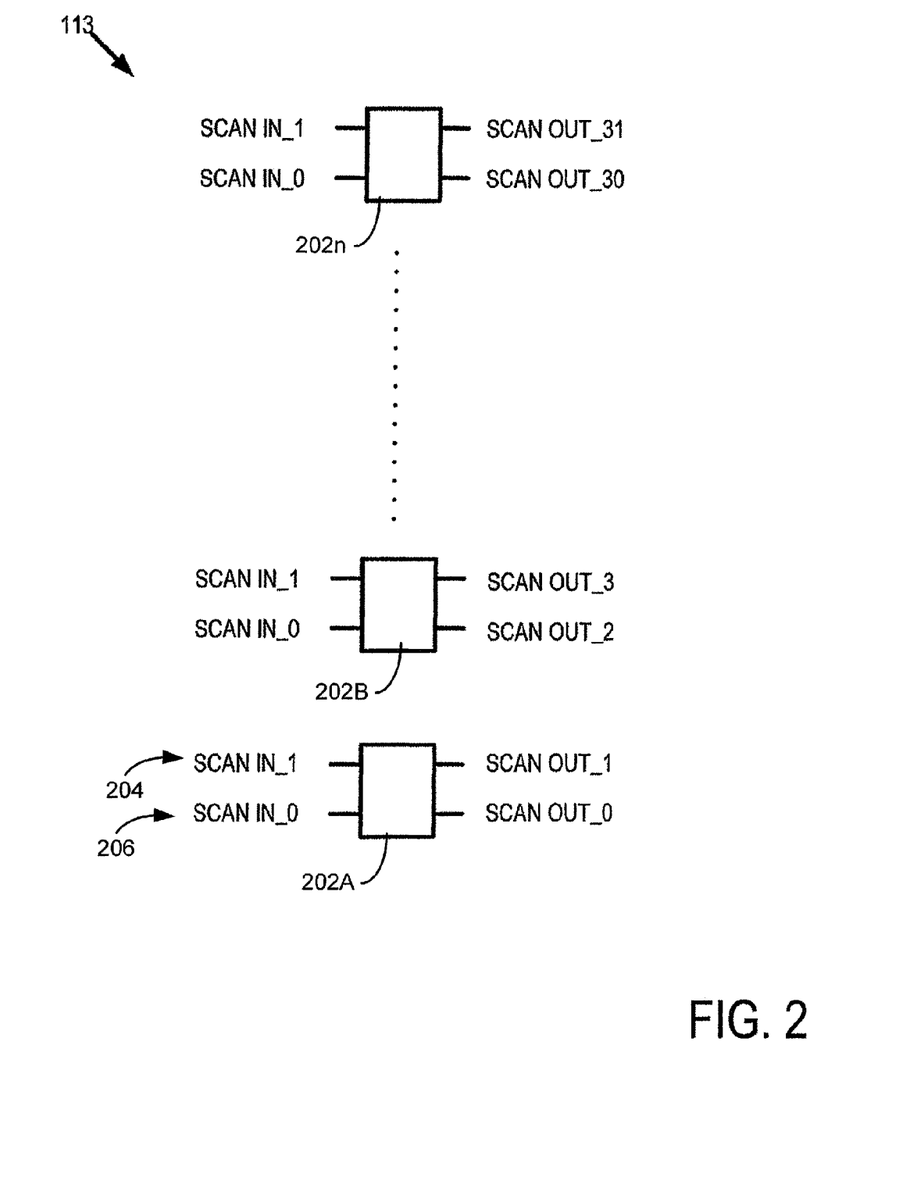
FIG. 2 illustrates an exemplary scan chain.
Figure 3:
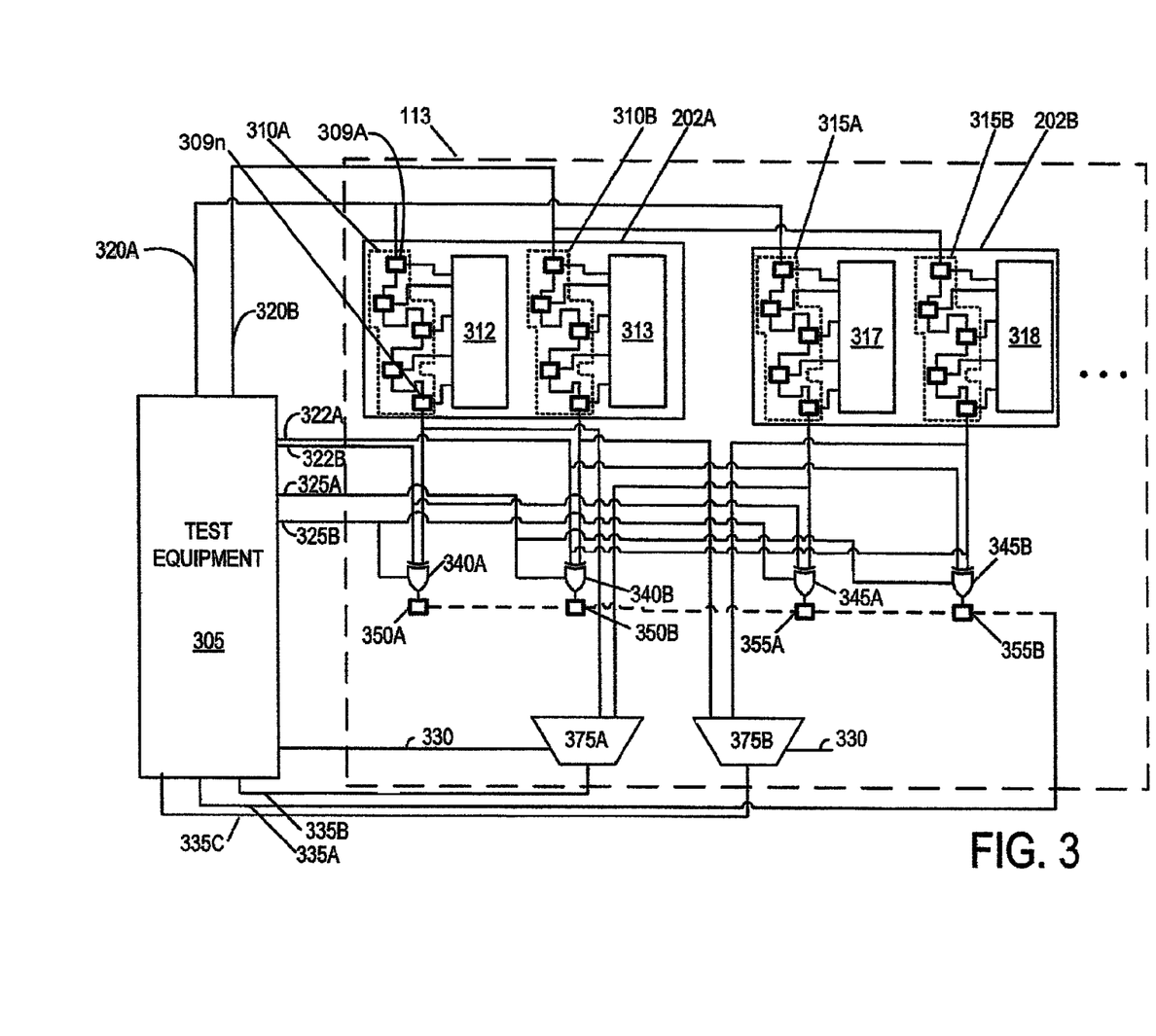
FIG. 3 illustrates exemplary scan chains in a multi-core processor.

FIGS. 2-3 illustrate embodiments that may be implemented to reduce the pin count of the processor 113 while overcoming the some or all of drawbacks of conventional testing approaches as well as other advantages. Referring to FIG. 2, the processor 113 may include multiple cores 202A-n, where each core is shown including at least two scan chains 204 and 206. Although two scan chains are shown and described herein, it should be appreciated that the various embodiments may include any number of scan chains.

As will be discussed in greater detail with regard to FIG. 3, each scan chain may include a plurality of registers (e.g., 310A-B and/or 315A-B) that are serially connected (although other embodiments are possible where some or all of the registers in the scan chain are non-serially connected). Note that the term "register" refers to a storage location for data, and may include, for example, flip-flops or other circuitry configured to store data. When the scan chains are connected to registers in this fashion, each scan chain may include, for example, a first register 309 A (shown in FIG. 3) that represents the beginning of the scan chain and a last register 309n (shown in FIG. 3) that represents the end of the scan chain. The input of the first register is called SCAN_IN and the output of the last register is called SCAN_OUT. Referring again to FIG. 2, some embodiments may include coupling the scan inputs for the various cores 202A-n to a common signal, such as SCAN IN_0 and SCAN IN_1. The outputs of the scan chains for the various cores 202A-n, however, may be coupled to various separate signals. For example, although core 202A and core 202B may have the inputs to their scan chains commonly coupled, the outputs of the core 202A and 202B may be separate as shown in FIG. 2. In this manner, scan chains coupled to similar logic within each of the cores 202A-n may yield similar outputs that can then be compared to the same expected values to determine if the logic is functioning properly. Thus, SCAN OUT_0 and SCAN OUT_2 may be compared to an expected value to determine if they match the expected value, where non-functional logic may be identified if the SCAN OUTs do not match the expected value.

In some embodiments, the processor 113 may be designed to include circuitry that processes the results from the scan chains prior to providing the results to a pin of the processor 113. FIG. 3 illustrates the multi-core processor 113 including such dedicated circuitry (e.g., 340A-B through 375A-B) and coupled to automated test equipment (ATE) 305. Referring to FIG. 3, the scan chains mentioned above with regard to FIG. 2 are shown in greater detail. The core 202A may include a first scan chain 310A of registers and a second scan chain 310B of registers. As shown, the registers may couple to certain logic blocks 312 and 313 within the core 202A. The logic blocks 312 and 313 may include any type of circuitry, such as arithmetic logic units, execution units, and instruction fetch units to name but a few types of circuits typically found in cores. In some embodiments, the logic block 312 may be identical in function and structure to the logic block 313, while in other embodiments, the logic blocks 312 and 313 may be different.

Each of the cores 202A-n in the multi-coreprocessor 113 may have the same structure and function. Thus, the core 202B may include a first scan chain 315A that is identical to the scan chain 310A and a second scan chain 315B that is identical to the scan chain 310B. Likewise, the scan chains 315A-315B may be coupled to logic blocks 317 and 318 that have similar functionality to the logic blocks 312 and 313 respectively.

As shown in FIG. 3, the ATE 305 may provide a plurality of input signals to the processor 113 via signal lines 320A-B, 322A-B, 325A-B and 330 and receive a plurality of output signals from the processor 113 via signal lines 335A-C. The input signal lines 320A-B may be SCAN IN data that includes predetermined patterns of data. This SCAN IN data may be determined from circuit simulations of the processor 113 prior to manufacturing. Note that the SCAN IN data may be provided using two pins of the processor 113.

These pre-manufacturing simulations also may provide output SCAN OUT data patterns that may be stored in the ATE 305. During testing, the signal lines 322A-B may provide the SCAN OUT data patterns so that the simulated SCAN OUT data patterns may be compared to the actual values from the scan chains 310A-B and 315A-B. One or more logic blocks may compare the actual output from the scan chains 310A-B and 315A-B with the simulated values from the ATE 305 via signal lines 322A-B. In some embodiments, the one or more logic blocks may be XOR gates 340A-B and 345A-B, whose output may be high or logic 1 anytime the inputs do not match and low or logic 0 if the inputs match. Note that the precise voltage values associated with logic 0 or logic 1 may vary between embodiments. The XOR gates 340A-B and 345A-B may be coupled to mask signals 325A-B respectively. As will be described in greater detail below, the mask signals 325A-B may allow for greater flexibility in testing the processor 113.

Registers 350A-B and 355A-B may couple to the XOR gates 340A-B and 345A-B to store the results of the comparison. In this manner, if all the SCAN OUT data from the logic blocks 312 and 313 matches all the data from the scan chains 310A-B and 315A-B, then the contents of the registers 350A-B and 355A-B may be logic 0. In some embodiments, the registers 350A-B and 355A-B may be configured as "sticky-bit" registers. The term "stick bit" refers to the notion that, over multiple testing cycles, just one mismatch value may cause the value in the registers to be set to logic 1. Thus, at the end of the testing cycle, if one of the sticky-bit registers 350A-B and 355A-B is set to logic 1, this may indicate that a mismatch occurred at some point during testing.

In some embodiments, it may be desirable to observe the SCAN OUT data of one or more of the cores (i.e., scan chains 310A-B and/or 315A-B) without bringing the actual SCAN OUT data signal to a package pin on the processor 113. Each package pin of an IC may necessitate separate input/output drivers as well as electrostatic discharge (ESD) circuitry, all of which consumes IC area and contributes to the peripheral footprint of the IC. By monitoring internal testing details without consuming a package pin, engineers may reduce the pin count of the IC and allow for the optimization of the area required to manufacture the IC.

The ATE 305 may observe the SCAN OUT data via multiplexers 375A-B, which may be controlled via the signal line 330. For example, as shown in TABLE 1, if the signal line 330 is equal to logic 0, then the multiplexers 375A-B may couple the signal lines 335B and 335C to the SCAN OUT data from scan chains 310A and 310B respectively. Similarly, if the signal line 330 is equal to logic 1, then the multiplexers 375A-B may couple the signal lines 335B and 335C to the SCAN OUT data from scan chains 315A and 315B respectively. Thus, the signal lines 335B and 335C may be switched between the scan chains in each of the cores 202A-B by changing the value of the signal line 330. Note that in some embodiments, the signal line 330 may be generated internally within the processor 113, and therefore, may not come from the ATE 305, thereby reducing the overall number of pins required for testing.

In some embodiments, it may be desirable to determine the values of the comparisons in registers 350A-B and 355A-B. As mentioned above, the registers 350A-B and 355A-B may be configured as sticky-bit registers in that comparison values from comparison blocks 340A-B and 345A-B may accumulate in the registers 350A-B. Regardless of whether the registers 350A-B and 355A-B are configured as sticky-bit registers, in some embodiments, the registers 350A-B and 355A-B optionally may be coupled together as a scan chain/shift register. This is shown in FIG. 3 where the dashed line between the registers 350A-B and 355A-B represents the optional scan chain.

Although FIG. 3 shows the multiplexers 375A-B with two inputs and one select signal line to select between the two inputs, it should be noted that various alternate embodiments are possible that include any number of processor cores 202A-n and/or comparison result registers. Consequently, the multiplexers 375A-B may be configured with $2^y$ inputs and y select lines to effectuate selection among the cores 202A-n.

TABLE 1

| Value of 330 | OUTPUT ON 335B | OUTPUT ON 335C |
|---|---|---|
| 0 | SCAN OUT from 310A | SCAN OUT from 310B |
| 1 | SCAN OUT from 315A | SCAN OUT from 315B |

Figure 4:
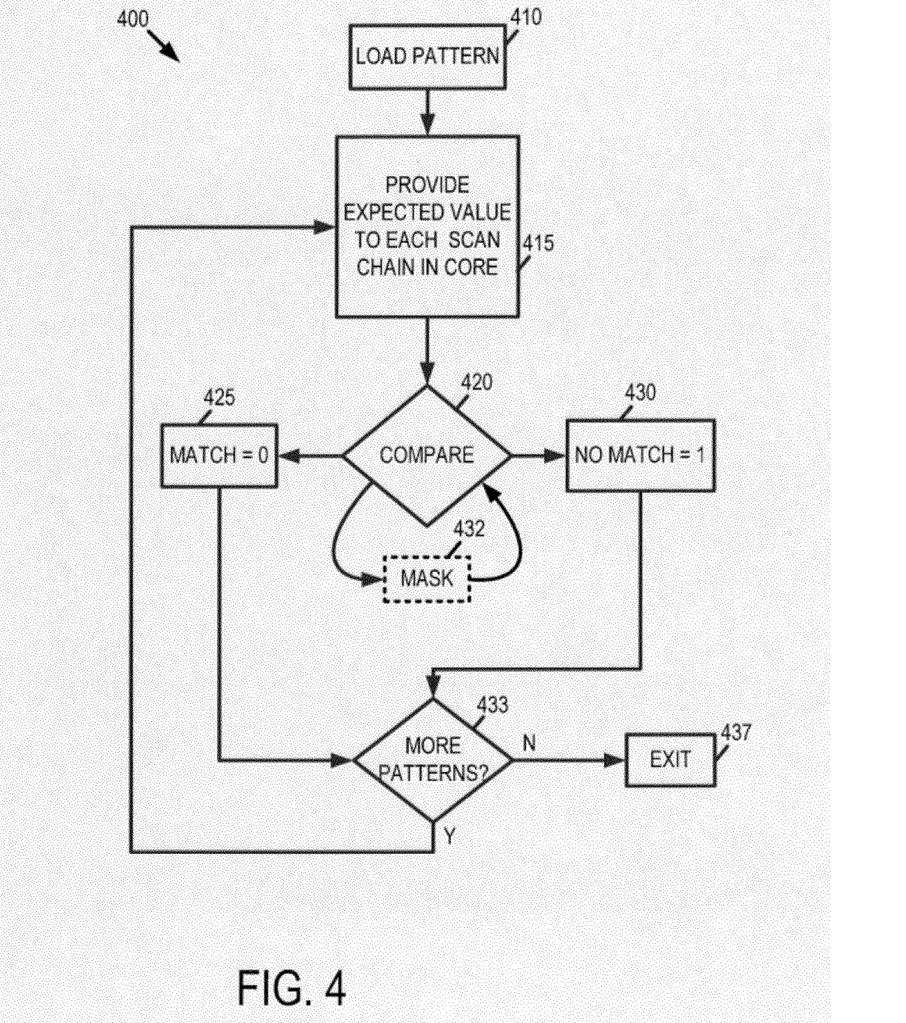
FIG. 4 illustrates an exemplary method for testing multi-core processors.

FIG. 4 illustrates operations 400 for identifying a non-functional core within a multicore processor without bringing the test response directly to package pins of the processor. The operations 400 may be employed on the multicore processor such as the processor 113 shown in FIG. 3, and therefore, for purposes of discussion, the operations 400 will be referred to in conjunction with the exemplary testing system shown in FIG. 3. It should be appreciated, however, that the operations of FIG. 4 may be implemented in numerous testing systems.

Referring now to FIG. 4, in block 410, the ATE 305 may load test patterns into the processor 113 via the SCAN IN lines 320A-B. The cores 202A-n may operate on this test data and the results from these operations may be stored in one or more of the scan chains 310A-B and/or 315A-B. In addition to loading the test patterns per block 410, the ATE 305 may provided expected values of the SCAN OUT data to the processor 113 via the signal lines 322A-B. This is shown in block 415.

Next, in block 420 a comparison may be made, for example, by XOR gates 340A-B and 345A-B between the expected values provided by the ATE 305 and the SCAN OUT data from the various scan chains 310A-B and 315A-B. As mentioned above in the context of the TABLE 1 the actual SCAN OUT data may be propagated to the ATE 305. For example, if the signal line 330 is logic 0, then the ATE 305 may monitor the scan chains 310A-B—i.e., the scan chains associated with the core 202A—by monitoring the outputs of the multiplexers 375A-B via the signal lines 335B-C.

In the event that the results from the scan chain do not match the expected value provided in block 415, the comparison blocks 340A-B and/or 345A-B may store a logic 1 in the registers 350A-B and/or 355A-B. As mentioned above, in the embodiments where the registers 350A-B and 355A-B are configured as sticky-bit registers, then a mismatch may set the sticky-bit register to a logic 1. On the other hand, in the event that the expected value matches the results from the scan chain, then a logic 0 may be stored in the registers 350A-B and/or 355A-B.

In some embodiments, for one reason or another, the expected SCAN OUT data may not be immediately be available. For example, the logic block 312 may not have received all the data necessary from another block within the processor 113, and as a result, the data in the scan chain 310A may be indeterminate. Engineers may determine this during the design phase of the processor 113 from circuit simulations. Thus, if the registers 350A-B and 355A-B are configured as sticky-bit registers, the registers 350A-B may be erroneously set to logic 1 (indicating mismatch) because data has yet to be available. To provide greater flexibility in testing, the processors 113 testing circuitry may include the mask signal 325A-B provided to the various comparison logic 340A-B and 345A-B. During operation, the comparison of block 420 may be prevented from occurring by asserting one or more of the mask signals 325A-B to one or more of the comparison logic blocks 340A-B or 345A-B. This is shown in block 432. The masking operation may be performed for a variety of reasons. For example, in some embodiments, despite the cores 202A-n (shown in FIG. 2) being identical, the output data stream may be different, and thus the comparison operation performed by logic blocks 340A-B or 345A-B may be masked.

More particularly, in these embodiments, each core 202A-n may include a core identifier (e.g., 4 bits) that is associated with each core and that is included in the output data stream coming from each individual core 202A-n. In this manner, as data is serially shifted out of the registers 350A-B and 355A-B, via signal line 335A, the ATE 305 may read the identifier and determine the core that is associated with the particular piece of data being shifted out of the registers 350A-B and 355A-B. Thus, masking the comparison operations, via mask signals 325A-B, may allow the comparison to ignore the comparison of the different core identifiers.

In situations where block 430 indicates no match—i.e., one of the cores being tested has not passed the desired testing—it may be desirable to continue testing. This is because, in a multicore processor, if one core is non-functional, yet others are functional, then the non-functional core may be disabled. For example, the non-functional core may be disabled by electrical programming or by blowing fuses on the processor 113. This may allow the processor 113 to be used and/or sold rather than discarding it because one or more of the cores are non-functional. The determination of which core is faulty may take place by scanning out the scan chain including the registers 340A-B and 345A-B through the signal line 335A. Accordingly, in some embodiments, once the results of the comparisons are written to the registers 350A-B and 355A-B control may flow to block 433 to determine if additional testing patterns exist for continued testing (despite the possibility of one or more faulty cores). If there are additional testing patterns, then control may flow back to block 415 where expected values are again provided to each scan chain in the cores 202A-n. On the other hand, if there are no additional testing patterns, then control may flow to block 437, where testing terminates.

From inspection of FIGS. 2-4 it can be appreciated that one or more non-functional cores may be identified from a single application of data by the ATE 305 on the SCAN IN data lines 320A-B, thereby saving valuable testing time. Also, non-functional cores may be identified without bringing the test results to the pins of the package of the processor 113, thereby saving potential IC area and allowing more space on the IC for desired functionality. TABLE 2 illustrates that the identification of non-functional cores may be accomplished with a reduced number of pins as compared to conventional approaches. The numbers in TABLE 2 assume two scan chains per core.

TABLE 2

| # of Cores | Conventional Pin Count | Proposed Pin Count |
|---|---|---|
| 2 | 2 + 4 = 6 | 2 + 2 + 2 + 2 + 1 = 9 |
| 4 | 2 + 8 = 10 | 2 + 2 + 2 + 2 + 2 = 10 |
| 8 | 2 + 16 = 18 | 2 + 2 + 2 + 2 + 3 = 11 |
| 16 | 2 + 32 = 34 | 2 + 2 + 2 + 2 + 4 = 12 |

For the case of two cores in the multicore processor, the conventional pin count is six: two SCAN INs that are shared between the cores and four SCAN OUTs, or one for each scan chain. The proposed pin count for the case of two cores is nine: two shared SCAN INs, two shared SCAN OUTs, two mask bits (one for each scan chain that are shared between cores, e.g., 325A shared between 340B and 345B), two expected data in lines (one for each scan chain that are shared between cores, e.g., 322A shared between 340B and 345B), and one select bit to select between which core is coupled the package pins. Note that FIG. 3 illustrates an two package pins for select lines 330A-B that are used in selecting between multiple inputs to the multiplexers 375A-B, however the two package pins are optional and a single pin may be used to select between two different cores.

Figure 5:
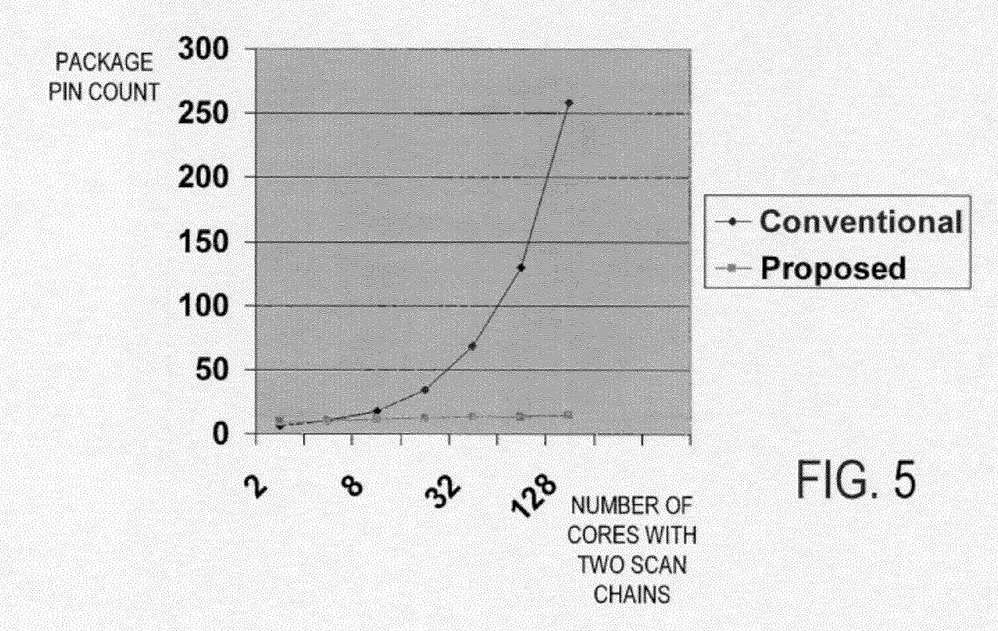
FIG. 5 illustrates graph representing potential pin count savings in the case of two scan chains per core.

As can be appreciated from examination of TABLE 2, when there are two cores on the multicore processor, the proposed pin count is greater than the conventional approaches. However, as the number of cores on the multicore processor increases, the pin count savings are realized. FIG. 5 graphically illustrates this relationship. This is because the conventional approaches have a pin associated with each SCAN OUT and the proposed approach shares SCAN OUT lines and selects among the SCAN OUT lines by adding an additional pin when necessary to select among the cores. Thus, when there are four cores on the multicore processor, the conventional and proposed pin counts are the same, yet as the number of cores on the multicore processor increase beyond four, the pin count savings become more noticeable.

Figure 6:
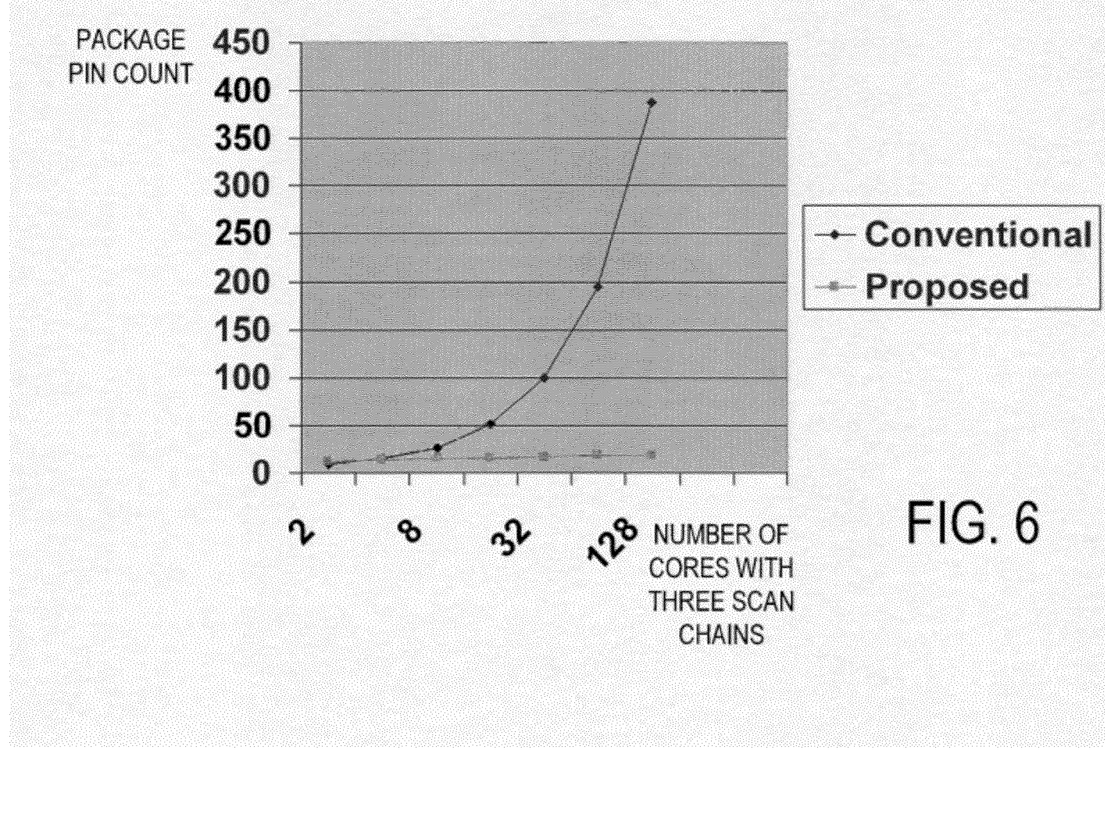
FIG. 6 illustrates graph representing potential pin count savings in the case of three scan chains per core.

TABLE 3 illustrates the pin count savings of conventional compared to the proposed approaches for the case when there are three scan chains per core. As can be appreciated from inspection of TABLE 3, the proposed approach has the ability to save a significant number of pins over conventional approaches. For example, when the processor has 16 cores, each with three scan chains, the potential pin count savings is 35. FIG. 6 graphically illustrates the potential pin count of the proposed approach versus conventional approach in embodiments implementing three scan chains per core.

TABLE 3

| # of Cores | Conventional Pin Count | Proposed Pin Count |
|---|---|---|
| 2 | 3 + 6 = 9 | 3 + 3 + 3 + 3 + 1 = 13 |
| 4 | 3 + 12 = 15 | 3 + 3 + 3 + 3 + 2 = 14 |
| 8 | 3 + 24 = 27 | 3 + 3 + 3 + 3 + 3 = 15 |
| 16 | 3 + 48 = 51 | 3 + 3 + 3 + 3 + 4 = 16 |

The above discussion is meant to be illustrative of the principles and various embodiments of the present invention. Numerous variations and modifications will become apparent once the above disclosure is fully appreciated. For example, while two and three scan chains per core have been described herein, any number of scan chains per core may be implemented in the multicore processors to achieve varying pin count savings. Also, while the term "core" may have been shown and described as a specific grouping of blocks traditionally associated with computer processing, the term "core" may include any type of logic block (e.g., adders, timing units, etc.) that may or may not be traditionally found in a processor core. Furthermore, selection of the core for testing purposes may be performed using the Joint Test Action Group (JTAG) instruction pursuant to the 1149.1 International Electrical and Electronics Engineers. In this manner, the number of pins required for core selection may be reduced. The claims should be interpreted to include any and all such variations and modifications. In addition, the above description has broad application, and the discussion of any embodiment is meant only to be exemplary, and is not intended to intimate that the scope of the disclosure, including the claims, is limited to these embodiments.

What is claimed is:

1. A multicore processor comprising:
    at least a first core and a second core, the first core and the second core each comprising a first logic block and a second logic block;
    a first data input coupled to a first scan chain associated with the first logic block in the first core and a second scan chain associated with the second logic block in the second core;
    a second data input, different than the first data input, coupled to a third scan chain associated with the second logic block in the first core and a fourth scan chain associated with the second logic block in the second core; and
    a first multiplexer including at least a first input and a second input, the first input coupled with a data output of the first scan chain and the second input coupled with a data output of the second scan chain;
    a second multiplexer including at least a first input and a second input, the first input coupled with a data output of the third scan chain and the second input coupled with a data output of the fourth scan chain,
    wherein the first and second multiplexers further include an output that couples to one or more pins on a package of the processor and a select signal that couples to the one or more pins on the package of the processor; and
    wherein the first data input and the second data input couples to the one or more pins on the package of the processor.

2. The processor of claim 1, further comprising the act of testing the first and second cores and wherein one or more responses from the first and second scan chains are selectively coupled to the one or more pins on the package of the processor when testing the first core.

3. The processor of claim 1, further comprising a comparison circuit coupled to one or more of the data outputs of at least one of the first and second scan chains and coupled to an expected value input, the expected value input being coupled to the one or more pins on the package of the processor.

4. The processor of claim 1, wherein the first logic block and the second logic block of the first core and the second core have dissimilar functionality.

5. The processor of claim 3, wherein a single assertion of input data to the processor occurs during testing.

6. The processor of claim 4, wherein the first core is determined as non-functional and the second core is determined as functional by examining the output data.

7. The processor of claim 3, further comprising a masking signal coupled to the comparison circuit, the masking signal coupled to the one or more pins of the package of the processor.

8. A method of testing a processor, the method comprising the acts of:
    providing a plurality of input signals to a plurality of cores, each core of the plurality of cores comprising a plurality of logic blocks and wherein each input of the plurality of inputs corresponds to at least one logic block of the plurality of logic blocks associated with the plurality of cores, wherein at least two of the plurality of input signals are dissimilar;
    monitoring a global signal that is indicative of a response of each core in the plurality of cores to at least one input signal in the plurality of input signals;
    in the event that the global signal indicates that at least one core in the plurality of cores is non-functional, selectively coupling a response of a first core within the plurality of cores to a package pin of the processor;
    comparing the response of the first core to an expected value; and
    in the event that the response of the first core matches the expected value, selectively coupling the response of a second core within the plurality to the package pin of the processor.

9. The method of testing of claim 8, wherein when that the response of the first core does not match the expected value, terminating the method of testing.

10. The method of testing of claim 8, wherein when that the response of the first core does not match the expected value, selectively coupling a third core within the plurality of cores to the package pin of the processor.

11. The method of testing of claim 8, wherein the act of comparing occurs internally within the processor.

12. The method of testing of claim 8, wherein a resulting value from the act of comparing is stored in a register.

13. The method of testing of claim 8, further comprising the act of reading out the resulting value stored in the register after the global signal indicates that at least one core in the plurality of cores is non-functional.

14. The method of testing of claim 8, further comprising the act of simultaneously providing the expected value to each core in the plurality of cores.

15. The method of testing of claim 8, further comprising the act of masking the act of comparing.

16. The method of testing of claim 8, wherein the act of providing the plurality of input signals occurs once during the method of testing.

17. A computer, comprising:
a memory; and
a multicore processor coupled to the memory, the processor comprising:
at least a first core and a second core, the first core and the second core each comprising a first logic block and a second logic block;
a first data input coupled to a first scan chain associated with the first logic block in the first core and a second scan chain associated with the second logic block in the second core;
a second data input, different than the first data input coupled to a third scan chain associated with the second logic block in the first core and a fourth scan chain associated with the second logic block in the second core; and
a first multiplexer including at least a first input and a second input, the first input of the first mulitplexer coupled with a data output of the first scan chain and the second input of the first mulitplexer coupled with a data output of the second scan chain;
a second multiplexer including at least a first input and a second input, the first input of the second multiplexer coupled with a data output of the first scan chain and the second input of the second multiplexer coupled with a data output of the second scan chain;
wherein the first and second multiplexers further include an output that couples to one or more pins on a package of the processor and a select signal that couples to the one or more pins on the package of the processor; and
wherein the first data input and the second data input couples to the one or more pins on the package of the processor.

18. The computer of claim 17, wherein the first core is identified as non-functional despite its output not being coupled to the one or more package pins.

19. The computer of claim 18, wherein the outputs of the first and second scan chains do not match each other.

20. The computer of claim 17, further comprising a circuit that masks the output of the first or second scan chains.

* * * * *